US009772960B2

(12) United States Patent
Gaiarsa et al.

(10) Patent No.: US 9,772,960 B2
(45) Date of Patent: Sep. 26, 2017

(54) SYSTEM AND METHOD FOR OPERATING SYSTEM AWARE LOW LATENCY INTERRUPT HANDLING

(71) Applicant: Wind River Systems, Inc., Alameda, CA (US)

(72) Inventors: Andrew Gaiarsa, Carp (CA); Maarten Koning, Bloomfield (CA); Felix Burton, Foster City, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 158 days.

(21) Appl. No.: 13/649,762

(22) Filed: Oct. 11, 2012

(65) Prior Publication Data
US 2014/0108690 A1    Apr. 17, 2014

(51) Int. Cl.
*G06F 13/26* (2006.01)
*G06F 9/48* (2006.01)

(52) U.S. Cl.
CPC ........... *G06F 13/26* (2013.01); *G06F 9/4812* (2013.01)

(58) Field of Classification Search
CPC . G06F 9/268; G06F 9/327; G06F 9/48; G06F 9/4812; G06F 13/24; G06F 13/26
USPC ........................................ 710/260, 262, 264
See application file for complete search history.

(56) References Cited

U.S. PATENT DOCUMENTS

| 8,386,684 | B2 * | 2/2013 | Gopalakrishnan et al. .. 710/269 |
| 2011/0072180 | A1 * | 3/2011 | Lee ............................... 710/260 |
| 2011/0106995 | A1 * | 5/2011 | Gopalakrishnan et al. .. 710/269 |
| 2014/0082243 | A1 * | 3/2014 | Betts et al. ................... 710/267 |

OTHER PUBLICATIONS

"AT91RM9200 FIQ FAQ and simple Example code / patch"; Warmcat; available online at warmcat.com; all pages.*
"Real-time performance using FIQ interrupt handling in SPEAr MPUs"; STMicroelectronics; AN3129; Jan 5, 2010; all pages.*
Ralph Moore; "Deferred Interrupt Processing"; Micro Digital; Dec. 27, 2005; all pages.*
Ralph Moore; "Link Service Routines"; Micro Digital; Dec. 22, 2005; all pages.*
Kliedermacher, David; "Minimizing Interrupt Response Time"; Information Quarterly, vol. 4; 2005; pp. 52-54.*

* cited by examiner

*Primary Examiner* — Thomas J Cleary
(74) *Attorney, Agent, or Firm* — Fay Kaplun & Marcin, LLP

(57) ABSTRACT

The exemplary embodiments described herein relate to systems and methods for operating system aware low latency handling. One embodiment relates to a non-transitory computer readable storage medium including a set of instructions executable by a processor, the set of instructions, when executed, resulting in a performance of receiving a fast interrupt request asserted by a hardware device while the processor is executing within a kernel critical section, executing a fast interrupt handler at a first priority level, raising a second priority level interrupt by the fast interrupt handler based on the fast interrupt request, wherein the second priority level interrupt invokes a kernel service and processing the second priority level interrupt once the processor has executed the kernel critical section.

18 Claims, 2 Drawing Sheets

System 100

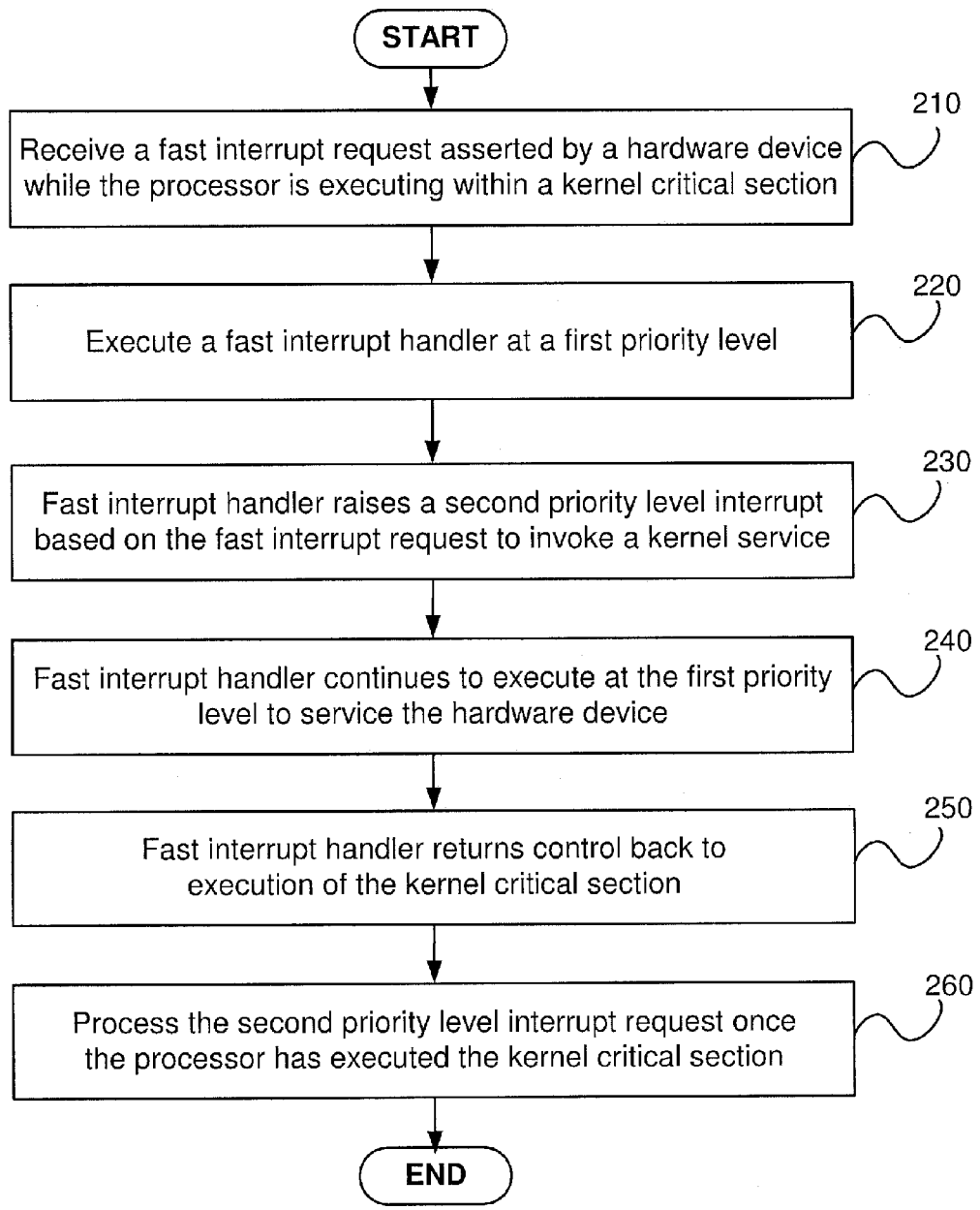

SYSTEM AND METHOD FOR OPERATING SYSTEM AWARE LOW LATENCY INTERRUPT HANDLING

BACKGROUND

A real-time operating system ("RTOS") is an operating system ("OS") intended to serve real-time application requests. One beneficial characteristic of an RTOS is the level of its consistency concerning the amount of time it takes to accept and complete an application's task. Furthermore, an RTOS utilizes an advanced algorithm for scheduling. Typically, scheduler flexibility enables a wider, computer-system orchestration of process priorities. However, a real-time OS is more frequently dedicated to a narrow set of applications. Key factors in a real-time OS include minimal interrupt latency and minimal thread switching latency. A real-time OS is valued more for how quickly or how predictably it can respond than for the amount of work it can perform in a given period of time.

Interrupt latency may be described as the time between the generation of an interrupt by a device and the servicing of the device which generated the interrupt. For many operating systems, devices may be serviced as soon as the interrupt handler of the device is executed. Interrupt latency may be affected by interrupt controllers, interrupt masking, and the operating system's interrupt handling methods. Many computer systems require low interrupt latencies, especially embedded systems that need to control machinery in real-time.

SUMMARY OF THE INVENTION

The exemplary embodiments described herein relate to systems and methods for operating system aware low latency handling. One embodiment relates to a non-transitory computer readable storage medium including a set of instructions executable by a processor, the set of instructions, when executed, resulting in a performance of receiving a fast interrupt request asserted by a hardware device while the processor is executing within a kernel critical section, executing a fast interrupt handler at a first priority level, raising a second priority level interrupt by the fast interrupt handler based on the fast interrupt request, wherein the second priority level interrupt invokes a kernel service and processing the second priority level interrupt once the processor has executed the kernel critical section.

A further embodiment relates to a system comprising a processor receiving a fast interrupt request asserted by a hardware device while the processor is executing within a kernel critical section, executing a fast interrupt handler at a first priority level, raising a second priority level interrupt by the fast interrupt handler based on the fast interrupt request, wherein the second priority level interrupt invokes a kernel service and processing the second priority level interrupt once the processor has executed the kernel critical section, and an operating system primitive masking out the second priority level interrupt. Accordingly, the operating system primitive, e.g. intCpuLock( ), for example, will lock out all normal priority interrupts, including any interrupts raised as a result of the "software interrupt instruction."

A further embodiment relates to a method comprising receiving a fast interrupt request asserted by a hardware device while the processor is executing within a kernel critical section, executing a fast interrupt handler at a first priority level, raising a second priority level interrupt by the fast interrupt handler based on the fast interrupt request, wherein the second priority level interrupt invokes a kernel service and processing the second priority level interrupt once the processor has executed the kernel critical section.

BRIEF DESCRIPTION OF THE DRAWINGS

FIG. 2 shows an exemplary embodiment of a method for utilizing a very low latency interrupt handling mechanism within a RTOS according to the exemplary embodiments described herein.

DETAILED DESCRIPTION

Figure 1:
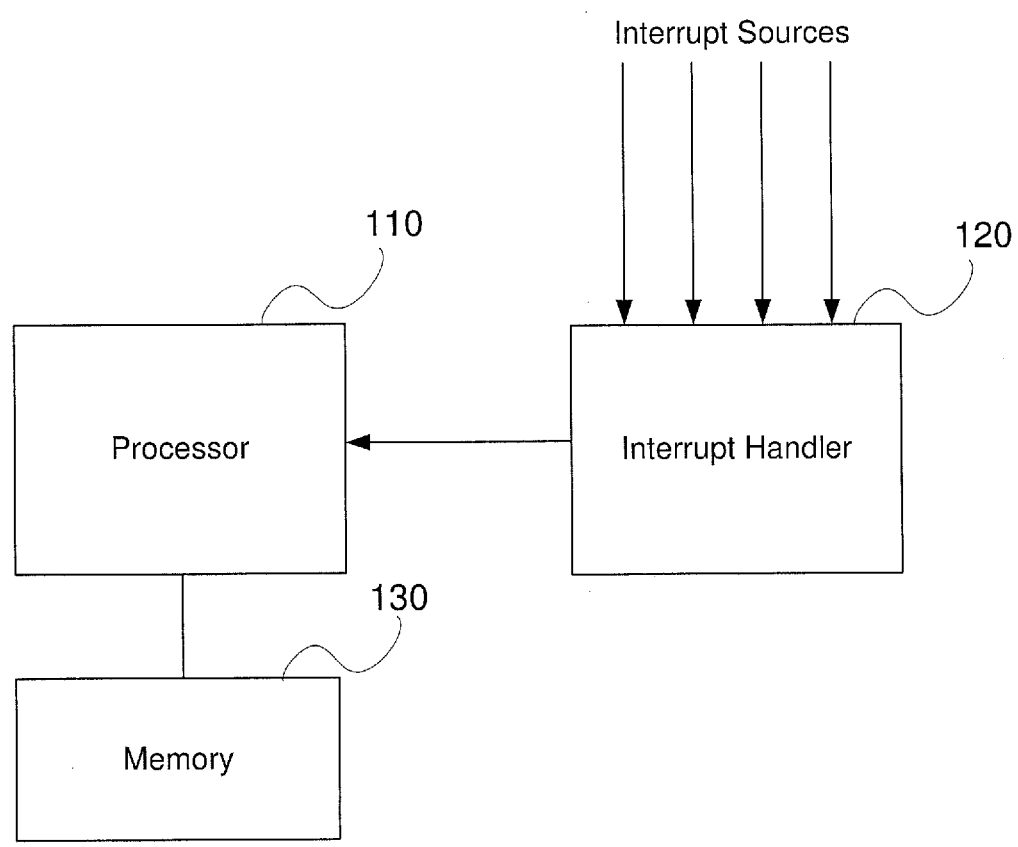
FIG. 1 shows an exemplary embodiment of a system for utilizing a very low latency interrupt handling mechanism within a RTOS according to the exemplary embodiments described herein.

The exemplary embodiments may be further understood with reference to the following description and the appended drawings, wherein like elements are referred to with the same reference numerals. The exemplary embodiments described herein relate to systems and methods for a low latency handling mechanism. Specifically, the exemplary embodiments relate to systems and methods for utilizing a very low latency interrupt handling mechanism within an operating system, such as a real-time operating system ("RTOS").

The exemplary embodiments may be employed on a reduced instruction set computer ("RISC") instruction set architecture ("ISA"), such as the Advanced RISC Machine ("ARM") processor. The ARM processor may be used as an exemplary processor architecture, specifically the ARM fast interrupt request ("FIQ") mode, and the software interrupt ("SWI") instruction. The SWI instruction is a user-defined synchronous interrupt instruction. Specifically, the SWI instruction may be used to allow a program running in a user mode to request privileged operations that need to be run in a supervisory mode in a controlled manner. According to one embodiment, the RISC may be a 32-bit RISC ISA. However, other embodiments are not limited to 32-bit processors and may be applied toward any type of processor (e.g., 64-bit processors, older 16-bit and 8-bit processors, etc.).

However, it should be understood to one skilled in the art, that the exemplary embodiments described herein may be applied to any processor architecture that provides two or more levels of interrupt prioritization, as well as the capability to raise an interrupt request via software. Furthermore, for any processor architecture that does not support the capability to raise an interrupt request via software, the exemplary embodiments described herein may still be applied if there exists a hardware device on the target that may be accessed to generate an interrupt on demand.

In addition, for any processor architectures and boards that do not have an instruction to raise a software interrupt (e.g., regular priority interrupt), the exemplary embodiments described herein may still be applied by the use of an operating system event queue. The high priority interrupt service routine may queue a software interrupt thread ("SIT") object onto the queue describing the work to be performed when normal level interrupts have been unlocked. The operating system event queue may be explicitly checked by the OS routine(s) used for re-enabling normal priority interrupts. The SIT objects are pre-allocated, and contain various information including the state (e.g., IDLE vs. PENDING), the address of the software interrupt handling function, optional client data, etc.

Interrupt latency is an attribute of a computer system which indicates the total amount of elapsed time from the point that a hardware device requests an interrupt, to the first instruction of the device driver interrupt service routine. In other words, interrupt latency is an elapsed time between a pair of events, wherein a first event occurs when a hardware device asserts an interrupt to the processor and a second event occurs when the first instruction of the device driver's interrupt handler function is executed.

The total interrupt latency consists of a hardware component, as well as a software component. The vast majority of the latency is due to the software component. The amount of latency attributable to the software component consists of the combination of at least three factors. A first factor is the amount of time that the operating system disables interrupts. A second factor is the execution time of the operating system's interrupt entry stub, which typically saves volatile registers and switches the stack pointer register to the interrupt stack. A third factor is the execution time of the interrupt controller device driver de-mux, or de-multiplexer, routine.

As will be described in greater detail below, the exemplary embodiments of the present invention eliminate the amount of time that the operating system disables interrupts of the interrupt latency attributable to the software component. Given that this portion of the latency is a significant contributor and is the only variable component of the total interrupt latency, the usage of interrupt locking primitives in an operating system should be carefully considered and constantly measured to ensure compliance with published interrupt latency benchmarks. This can be difficult and time consuming, thus providing an interrupt handling mechanism that eliminates latency due to the amount of time that the operating system disables interrupts has many benefits.

FIG. 1 shows an exemplary embodiment of a processing system 100 for utilizing a very low latency interrupt handling mechanism within a RTOS according to the exemplary embodiments described herein. The system 100 may include a processor 110, an interrupt handler 120 and a memory 130. It should be noted that while the exemplary system 100 is described as using an ARM processor, the exemplary system 100 may utilize any type of processor having a fixed length (e.g., 32-bit, 64-bit, etc.) RISC ISA, such as a processor architecture using an A32 instruction set, an A64 instruction set, etc.

The ARM processor architecture may provide a fast interrupt request ("FIQ") mode distinct from the normal interrupt request ("IRQ") mode. In other words, the FIQ mode is higher priority than the IRQ mode. For example, when a hardware device asserts a FIQ, the processing system 100 may immediately enter into FIQ mode regardless of a current mode of the processing system 100. Furthermore, masking out of IRQ mode will not prevent the execution of a FIQ interrupt service routine. The term "masking out" is equivalent to "disabling" in this context. In other words, operating systems typically provide a primitive, e.g., intCpuLock( ) in the case of VxWorks, which will disable, or mask out, IRQ mode interrupts on the ARM architecture.

Before entering a kernel critical section, an operating system will disable interrupts. For instance, within the RTOS VxWorks provided by Wind River Systems, interrupts are disabled using the intCpuLock( ) primitive. The intCpuLock( ) primitive will only mask out the IRQ. Therefore, when a hardware device asserts a FIQ, the handler 120 will be executed with relatively low latency since the portion of the interrupt latency attributable to the software component will be eliminated, namely the amount of time that the operating system disables interrupts. However, it may also be observed that given that a FIQ interrupt service routine may potentially be executing while the operating system is within a kernel critical section, the FIQ interrupt service routine must not invoke any operating system services (e.g., giving a semaphore). Accordingly, the FIQ interrupt service routine will be executed outside the operating system, and thus, it cannot be "OS aware." A body of code, e.g. an interrupt service routine, may be deemed "OS aware" if the code is able or permitted to invoke operating system primitives to signal an event to a task, for example.

The exemplary processing system 100 described herein allows for a FIQ interrupt service routine to invoke an operating system primitive, e.g. to give a semaphore, that is typically only permitted during the execution of normal interrupt service routines. This capability is not currently offered in any conventional operating system.

The FIQ mode of the processing system 100 includes its own dedicated set of registers r8-r14. For instance, when the processor 110 acknowledges a FIQ and switches into "FIQ mode", the software will be able to utilize registers r8-r14 without destroying the contents of the same denoted registers utilized by the interrupted context. Accordingly, this allows the operating system interrupt entry stub to forgo the saving of registers r8-r14. In other words, the processor 110 may provide a "fresh" set of registers r8 to r14 when switching to FIQ mode, wherein the set of register r8 to r14 used by an IRQ mode interrupt handler or task level code may be preserved. In addition, the term "stub" refers to a small portion of code that operating systems may insert in the execution path when handling all interrupts. A stub may save the volatile register set, increment a global variable representing the interrupt nest level, and perform any other general housekeeping duties required by the operating system. Once the stub has finished, then execution is transferred to the actual device driver interrupt service routine.

It may be presumed that an assembly coded interrupt service routine that restricts usage to only registers r8-r14 has been connected to service the FIQ. This capability of an ARM processor, or any other similar capability provided by other processor architectures, is not directly related to the exemplary systems and methods described herein. However, as will be described in detail below, the very low latency interrupt handling scheme may be also be utilized by an FIQ interrupt service routines coded in assembly.

As mentioned above, a significant reduction in interrupt latency will occur for FIQ handlers since the interrupt primitive (e.g., intCpuLock( )) may continue to only mask out IRQs, thereby eliminating the amount of time that the operating system disables interrupts from the software component of the total interrupt latency. As noted above, the total interrupt latency consists of a hardware component and a software component. A further significant capability can be realized by also supporting the invocation of operating system primitives from an FIQ interrupt service routine.

The basic premise of the exemplary processing system 100 is to provide a mechanism where the FIQ interrupt service routine raises a software interrupt, such as by using the SWI instruction, in order to raise a regular priority interrupt. Specifically, when the processing system 100 executes the SWI instruction, the current program status register ("CPSR") may be copied into the supervisor mode saved program status register (SPSR_SVC). This will save the current mode, interrupt mask and condition flags.

As discussed in the example above, normal, or "regular," priority interrupt requests are masked out by the intCpuLock( ) primitive. Therefore, if the FIQ is asserted while the operating system is executing within a kernel critical section (e.g., where normal priority interrupts have been masked out via intCpuLock( )), the raising of the software interrupt will not be acknowledged or processed until the FIQ interrupt service routine has returned, and the interrupted context, either task or a normal priority interrupt service routine, has exited the kernel critical section and re-enabled regular priority interrupts via the intCpuUnlock( ) primitive.

Accordingly, the posting of a regular priority interrupt from a FIQ interrupt service routine may initiate the deferred invocation of an operating system primitive and, thus, avoid the corruption of the kernels state.

This exemplary method allows for a FIQ interrupt service routine to exhibit very low latencies and thus able to perform demanding real-time critical operations. Furthermore, the exemplary method also allows the FIQ interrupt service routine to invoke operating system primitives that are normally only permitted during the execution of normal priority interrupt service routines.

The actual implementation and application programming interfaces ("APIs") for the aforementioned mechanism may vary. For instance, one possible implementation may provide a set of FIQ-specific operating system primitives parallel to the existing primitives callable from regular priority interrupt service routines. The term "parallel" describes a one-to-one correspondence that exists between FIQ primitives and regular primitives. For instance, using the VxWorks RTOS as an example, a fiqSemGive( ) API may be provided that parallels the existing semGive( ) API to relinquish a specified semaphore and unblock the next available task. The FIQ versions of the operating system primitives may queue the requested services (e.g., function pointer and parameter(s)) onto a circular buffer, and post a regular priority software interrupt using a dedicated request number (e.g., via the SWI instruction on ARM). The interrupt service routine for the software posted interrupt may "de-queue" the function pointer and parameter(s) and directly invoke the kernel primitive.

The management of the circular buffer containing the services requested from a FIQ interrupt service routine may be very simple, such as, for instance, a lockless increment and potential mask of a reader and writer indices. Accordingly, only the FIQ interrupt service routine may write to the circular buffer and a single regular priority interrupt handler may read from the circular buffer.

An optimization may be implemented in the FIQ versions of the operating system primitives when the regular priority interrupts have not been masked out, such as by examining a processor specific register. If the regular priority interrupts have not been masked out, then the context interrupted by the FIQ interrupt service routine is not executing within a kernel critical section. Therefore, it is permissible to directly call the requested kernel primitive rather than queuing the request onto a circular buffer and then posting a software interrupt. Accordingly, this optimization may help to improve overall system performance, as measured by bandwidth, since the majority of FIQ assertions may occur outside a kernel critical section.

As discussed above, the exemplary systems and methods may include an assembly coded FIQ interrupt service routine to handle the FIQ interrupt. This routine may provide additional reduction in interrupt latency since the operating systems interrupt entry stub does not need to save registers r8-r14. It should be noted that while the innovation described herein is applicable to such assembly coded FIQ interrupt service routines, embodiments may require that the FIQ versions of the operating system primitives (e.g., fiqSemGive( )) to also be coded in assembly and restrict themselves to registers R8-R14.

Those skilled in the art will understand that the above-described exemplary embodiments may be implemented in any number of manners, including, as a separate software module, as a combination of hardware and software, etc. For example, the exemplary systems and methods may be implemented within a program containing lines of code stored in any type of non-transitory computer-readable storage medium that, when compiled, may be executed by a processor.

FIG. 2 shows an exemplary embodiment of a method 200 for operating system aware low latency handling according to the exemplary embodiments described herein. It should be noted that the exemplary method 200 will be discussed with reference to the processing system 100 of FIG. 1. Accordingly, the method 200 allows for an operating system, such as the processing system 100, to provide a very low latency interrupt handling mechanism.

In step 210, the method 200 may receive a fast interrupt request ("FIQ") asserted by a hardware device while the processor is executing within a kernel critical section. According to the exemplary method 200, the execution of the kernel primitive, e.g. semGive( ), invoked by the FIQ may be treated as a regular priority interrupt ("IRQ"). The underlying kernel primitive, e.g. semGive( ), may then be executed in the context of a regular priority interrupt due to the fiqSemGive( ) implementation "raising" a regular priority request, e.g., via the 'swi' instruction on ARM. The regular priority interrupt request will not be serviced to execute the semGive( ) function until interrupts have been re-enabled once the kernel exits the kernel critical section. This may presume that the kernel was actually in a critical section when the FIQ interrupt was requested.

In step 220, the method 200 may execute a fast interrupt handler at a first priority level. As noted above, an ARM processor may be used as an exemplary processor architecture. This processor architecture may include a first priority level, such as a fast interrupt request mode (i.e., FIQ mode), and a second priority level, such as a regular interrupt request mode (i.e., IRQ mode). The fast interrupt request mode has a higher priority than the regular interrupt request mode. Thus, when a hardware device asserts a fast interrupt, the processor may immediately enter into fast interrupt request mode regardless of the current mode of the processor.

In step 230, the method 200 may raise a second priority level interrupt based on the fast interrupt request using the fast interrupt handler to invoke a kernel service.

According to the exemplary embodiments described herein, the "swi" instruction is a mechanism to allow software to raise a normal priority interrupt (i.e., IRQ mode). Accordingly, this instruction may be used on ARM processors as a potential method to allow a FIQ handler to post kernel work to be performed at normal priority interrupt level. For example, the FIQ handler could invoke the fiqSemGive) primitive, and the fiqSemGive( ) primitive would then issue a "swi" instruction, along with providing some basic information in a data queue, so that the actual semGive( ) operation can be performed at the normal interrupt priority.

In step 240, the method 200 may optionally allow the fast interrupt handler to continue to execute at the first priority level to service the hardware device. It should be noted that step 240 may be optional, as the FIQ interrupt handler may simply return after invoking the kernel primitive, e.g.

fiqSemGive( ), or it may choose to continue to execute and interact with the hardware device that asserted the FIQ interrupt request.

In step 250, the method 200 may return control back to the fast interrupt handler, and thereby return control back to the execution of the kernel critical section.

In step 260, the method 200 may process the second priority level interrupt request once the processor has executed the kernel critical section. Specifically, the raising of the software interrupt may not be acknowledged until the fast interrupt service routine has returned and the interrupted context has exited the kernel critical section, and thus, re-enabled regular priority interrupts.

Specifically, an exemplary operating system primitive, such as intCpuLock( ), will mask regular priority requests. It should be noted that masking out the regular interrupt request mode will not prevent the execution of a fast interrupt service routine.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-transitory computer readable storage medium including a set of instructions executable by a processor, the set of instructions, when executed, results in a performance of the following:
   executing an operating system within a kernel critical section, wherein executing within the kernel critical section includes masking out a second priority level interrupt request;
   executing a fast interrupt handler in a user mode when the operating system is within the kernel critical section, wherein the user mode includes a software interrupt instruction that can be utilized by the fast interrupt handler to request a kernel service;
   receiving, by the fast interrupt handler, a fast interrupt request asserted by a hardware device when the operating system is within the kernel critical section, wherein the fast interrupt request includes a request to invoke a kernel service that corresponds to the second priority level interrupt request;
   raising, by the fast interrupt handler through the software interrupt instruction when the operating system is within the kernel critical section, the request to invoke the kernel service that corresponds to the second priority level interrupt request;
   deferring invocation of the kernel service that corresponds to the second priority level interrupt request to avoid invoking the kernel service that corresponds to the second priority level interrupt request until after the operating system has exited the kernel critical section; and
   processing the second priority level interrupt request after the operating system exited the kernel critical section.

2. The non-transitory computer readable storage medium of claim 1, wherein the execution of the set of instructions further results in the performance of the following:
   after the operating system has exited the kernel critical section continuing to execute the fast interrupt handler in the user mode to service the hardware device.

3. The non-transitory computer readable storage medium of claim 1, wherein the second priority level interrupt request is a regular interrupt request ("IRQ").

4. The non-transitory computer readable storage medium of claim 1, wherein the execution of the set of instructions further results in the performance of the following:
   queuing the requested kernel service that corresponds to the second priority level interrupt request onto a buffer; and
   managing the buffer with a lockless increment of reader and writer indices.

5. The non-transitory computer readable storage medium of claim 1, wherein the processor is a component within a reduced instruction set computer ("RISC") instruction set architecture ("ISA").

6. The non-transitory computer readable storage medium of claim 1, wherein the user mode includes a dedicated set of registers that can be utilized by the fast interrupt handler.

7. The non-transitory computer readable storage medium of claim 1, wherein the operating system is a real-time operating system ("RTOS").

8. The non-transitory computer readable storage medium of claim 1, wherein processing the second priority level interrupt request includes enabling the second priority level interrupt request.

9. A system, comprising:
   a processor executing an operating system within a kernel critical section, wherein executing within the kernel critical section includes masking out a second priority level interrupt request;
   executing a fast interrupt handler in a user mode when the operating system is within the kernel critical section, wherein the user mode includes a software interrupt instruction that can be utilized by the fast interrupt handler to request a kernel service;
   receiving, by the fast interrupt handler, a fast interrupt request asserted by a hardware device when the operating system is within the kernel critical section, wherein the fast interrupt request includes a request to invoke a kernel service that corresponds to the second priority level interrupt request;
   raising, by the fast interrupt handler through the software interrupt instruction when the operating system is within the kernel critical section, the request to invoke the kernel service that corresponds to the second priority level interrupt request;
   deferring invocation of the kernel service that corresponds to the second priority level interrupt request to avoid invoking the kernel service that corresponds to the second priority level interrupt request until after the operating system has exited the kernel critical section; and
   processing the second priority level interrupt request after the operating system exited the kernel critical section.

10. The system of claim 9, wherein after the operating system has exited the kernel critical section continuing to execute the fast interrupt handler in the user mode to service the hardware device.

11. The system of claim 9, wherein the second priority level is a regular interrupt request ("IRQ").

12. The system of claim 9, wherein the processor queues the requested kernel service that corresponds to the second priority level interrupt request onto a buffer, and manages the buffer with a lockless increment of reader and writer indices.

13. A method of updating an address table, comprising:
   executing an operating system within a kernel critical section, wherein executing within the kernel critical section includes masking out a second priority level interrupt request;

executing a fast interrupt handler in a user mode when the operating system is within the kernel critical section, wherein the user mode includes a software interrupt instruction that can be utilized by the fast interrupt handler to request a kernel service;

receiving, by the fast interrupt handler, a fast interrupt request asserted by a hardware device when the operating system is within the kernel critical section, wherein the fast interrupt request includes a request to invoke a kernel service that corresponds to the second priority level interrupt request;

raising, by the fast interrupt handler through the software interrupt instruction when the operating system is within the kernel critical section, the request to invoke the kernel service that corresponds to the second priority level interrupt request;

deferring invocation of the kernel service that corresponds to the second priority level interrupt request to avoid invoking the kernel service that corresponds to the second priority level interrupt request until after the operating system has exited the kernel critical section; and processing the second priority level interrupt request after the operating system exited the kernel critical section.

14. The method of claim 13, further including:
after the operating system has exited the kernel critical section continuing to execute the fast interrupt handler in the user mode to service the hardware device.

15. The method of claim 13, further including:
queuing the requested kernel service that corresponds to the second priority level interrupt request onto a buffer; and managing the buffer with a lockless increment of reader and writer indices.

16. The method of claim 15, wherein the fast interrupt handler writes the requested kernel service to the buffer before the operating system exits the kernel critical section and a second priority interrupt handler reads the requested kernel service from the buffer after the operating system exited the kernel critical section.

17. The method of claim 13, wherein the processor is a component within a reduced instruction set computer ("RISC") instruction set architecture ("ISA").

18. The method of claim 13, wherein the user mode includes a dedicated set of registers that can be utilized by the fast interrupt handler.

* * * * *